United States Patent [19]

Miyashita

[11] Patent Number: 5,250,967
[45] Date of Patent: Oct. 5, 1993

[54] LIQUID CRYSTAL PROJECTOR

[75] Inventor: Yoshiaki Miyashita, Daito, Japan

[73] Assignee: Sanyo Electric Co., Ltd., Moriguchi, Japan

[21] Appl. No.: 813,633

[22] Filed: Dec. 26, 1991

[30] Foreign Application Priority Data

Dec. 27, 1990 [JP] Japan ................ 2-408215
Jun. 6, 1991 [JP] Japan ................ 3-135053

[51] Int. Cl.$^5$ .............................. G03B 21/00
[52] U.S. Cl. ........................... 353/38; 353/37; 353/122; 359/40
[58] Field of Search ........... 353/31, 33, 34, 37, 353/30, 38, 122, 98, 99; 359/40, 41

[56] References Cited

U.S. PATENT DOCUMENTS 5,005,968  4/1991  Tejima et al. ............. 353/38
5,052,783  10/1991 Hamada .................... 353/40

FOREIGN PATENT DOCUMENTS 0392387  10/1990  European Pat. Off. .
0241024  11/1985  Japan ...................... 359/40
2062282   5/1981  United Kingdom .

OTHER PUBLICATIONS

Patent Abstracts of Japan, vol. 13, No. 144 (E-740), Apr. 10, 1989; & JP-A-63 306 792 (Canon Inc.) Dec. 14, 1988.
Patent Abstracts of Japan, vol. 13, No. 126 (E-734), Mar. 28, 1989; & JP-A-63 292 880 (Kawasaki Heavy Ind. Ltd.) Nov. 30, 1988.

*Primary Examiner*—William A. Cuchlinski, Jr.
*Assistant Examiner*—William C. Dowling
*Attorney, Agent, or Firm*—Armstrong, Westerman, Hattori, McLeland & Naughton

[57] ABSTRACT

A liquid crystal projector for projecting original images formed on a liquid crystal panel onto a screen comprises optical means 3 between the liquid crystal panel 2 and the screen 4. The optical means 3 has a first refracting portion comprising planar glass plates 3a, 3c having a predetermined angle of inclination with respect to the optical axis of the panel, and a second refracting portion comprising planar glass plates 3b, 3d having an angle of inclination different from that of the first refracting portion. The position where an image is formed by the first refracting portion on the screen is shifted from the image forming position for the second refracting portion by a small amount corresponding to the pitch of picture elements on the screen to form projected images of improved quality.

5 Claims, 6 Drawing Sheets

LIQUID CRYSTAL PROJECTOR

FIELD OF THE INVENTION

The present invention relates to liquid crystal projectors for projecting original images formed on a liquid crystal panel onto a screen.

BACKGROUND OF THE INVENTION

To utilize the characteristics of liquid crystal panels that they are reduced in thickness, size, weight and power consumption, liquid crystal television receivers and liquid crystal projectors incorporating a liquid crystal panel have been developed.

Original images are formed on liquid crystal panels by a multiplicity of picture elements (pixels), so that no problem is encountered in directly viewing liquid crystal television receivers, whereas liquid crystal projectors have the following two problems since in this case, light from a light source is passed through the liquid crystal panel to project the image thereon onto a screen upon enlargement.

The first of the problems is that especially with liquid crystal projectors having three liquid crystal panels for red, green and blue colors, the source lines and gate lines extending from the respective liquid crystal cells forming the panels are projected as enlarged, producing lattice shade on the screen to lower the quality of images.

The second problem is that especially with liquid crystal projectors having a single liquid crystal panel and a single color filter for the three primary colors, the red picture elements, green picture elements and blue picture elements forming images are individually projected as enlarged on a screen, such that the picture elements of three primary colors in a set are arranged with a large pitch to produce images of impaired quality.

To solve these problems, Unexamined Japanese Patent Publication SHO 63-292880 discloses a liquid crystal projector wherein the original image formed on a liquid crystal panel is projected as enlarged onto a screen by passing light from a light source through the panel, and which includes an optical axis vibrating device interposed between the liquid crystal panel and the screen for vibrating the image to be projected onto the screen with a predetermined cycle.

However, the liquid crystal projector is complex in construction and large-sized since the projector additionally requires the optical axis vibrating device. Furthermore, it is difficult to accurately control the amplitude of vibration of images by the vibrating device, which is therefore likely to undesirably lower the resolution of images to be projected.

SUMMARY OF THE INVENTION

An object of the present invention is to provide a liquid crystal projector of simple construction for projecting images with a high quality.

Another object of the invention is to provide a liquid crystal projector which comprises optical means provided between a liquid crystal panel and a screen for light from the liquid crystal panel to pass therethrough, the optical means comprising a plurality of light refracting portions joined to one another for projecting original images formed on the liquid crystal panel onto the screen, as shifted by an amount not greater than the pitch of picture elements.

In a liquid crystal projector having three liquid crystal panels for three primary colors, the amount of shift of images on the screen by the light refracting portions of the optical means is determined in corresponding relation with the band width of latticelike shade produced when the nontranmission portions between the liquid crystal cells forming the liquid crystal panels are projected as enlarged on the screen.

The original images formed on the liquid crystal panels are projected as displaced by the amount of shift in accordance with the band width of the shade, so that the images projected are free of shade and have a high quality.

Further in a liquid crystal projector having a single liquid crystal panel and a single color filter for three primary colors, the amount of shift of images on the screen by the light refracting portions of the optical means is determined in corresponding relation with the pitch of picture elements obtained when the liquid crystal cells forming the panel are projected as enlarged on the screen.

With this liquid crystal projector, the picture elements of three primary colors are superposed on one another over the screen to form an image, so that the pitch of picture elements of three primary colors arranged as a set is reduced to one-third of the conventional pitch to give an improved quality to the image.

Another object of the present invention is to provide a liquid crystal projector which comprises optical means disposed between a liquid crystal panel and a screen for reflecting light from the liquid crystal panel toward the screen, the optical means comprising a plurality of light reflecting portions joined to one another for projecting original images on the liquid crystal panel onto the screen, as shifted by an amount not greater than the pitch of picture elements.

The optical means is a reflecting mirror which is formed on its reflecting side with a plurality of stepped portions serving as the light reflecting portions, and the shift of the images on the screen is realized by a difference between the optical path lengths from the liquid crystal panel to the respective stepped portions of the reflecting mirror.

Accordingly, when the amount of shift of images is set to the pitch of picture elements obtained when the liquid crystal cells forming the panel are projected on the screen on an enlarged scale, the pitch of picture elements on the screen becomes very small to produce images of improved quality.

DETAILED DESCRIPTION OF EMBODIMENTS

Several embodiments of liquid crystal projectors will be described first which have optical means of the light transmission type.

Figure 1A:
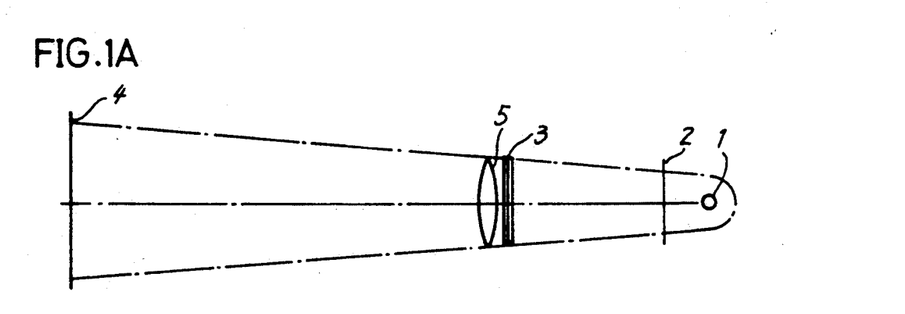
FIGS. 1A and 1B are a plan view and a side elevation, respectively, showing the optical system of a liquid crystal projector having optical means of the light transmission type.
Figure 1B:
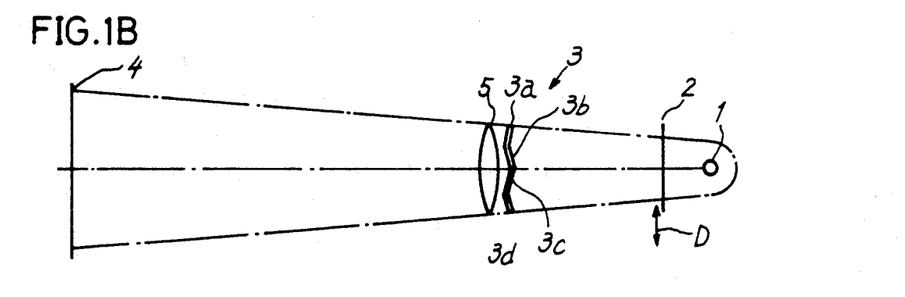

FIGS. 1A and 1B show a liquid crystal projector which comprises a light source 1, for example, in the form of a metal halide lamp, a single liquid crystal panel 2, optical means 3 comprising four flat glass plates 3a, 3b, 3c, 3d which are uniform in thickness and joined to one another, and a projection lens 5 for projecting original images formed on the panel 2 onto a screen 4 on an enlarged scale.

The optical means 3 comprises a first refracting portion including the glass plates 3a, 3c, and a second refracting portion including the glass plates 3b, 3d. The flat glass plates 3a, 3c constituting the first refracting portion are arranged at the same angle of inclination, i.e., +4 deg to +8 deg with respect to the direction D of height of the liquid crystal panel 2. Further the flat glass plates 3b, 3d providing the second refracting portion are arranged at the same angle of inclination, i.e., −4 deg to −8 deg with respect to the direction D of height of the panel 2.

Figure 2A:
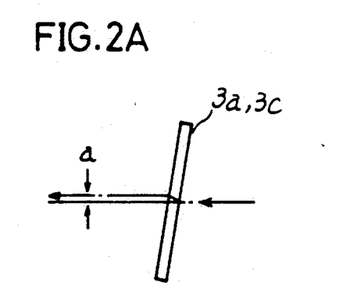
FIGS. 2A and 2B are diagrams for illustrating refraction of light by planar glass plates forming the optical means.
Figure 2B:
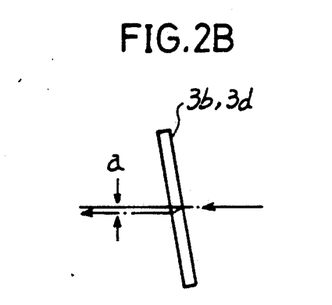
Figure 3A:
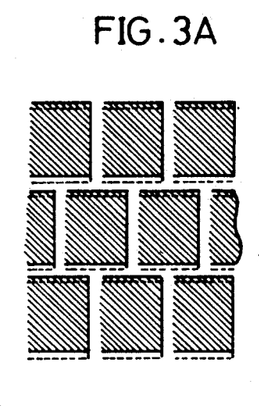
FIGS. 3A, 3B, 3C and 3D are diagrams for illustrating superposed images formed on a screen by light passing through planar glass plates.

Accordingly, of the light passing through the liquid crystal panel 2, the light portion passing through the first refracting portion, i.e. the glass plates 3a, 3c, is refracted as indicated by a broken-line arrow in FIG. 2A and projected as shifted upward by a distance a (¼ to ½ of the pitch of picture elements on the screen) from the original image-forming position (indicated in broken lines) as shown in FIG. 3A. Further of the light passing through the liquid crystal panel 2, the light portion passing through the second refracting portion, i.e., the glass plates 3b, 3d, is refracted as indicated by a broken-line arrow in FIG. 2B and projected as shifted downward from the original image-forming position (indicated in broken lines) as shown in FIG. 3B by a distance a.

Figure 3B:
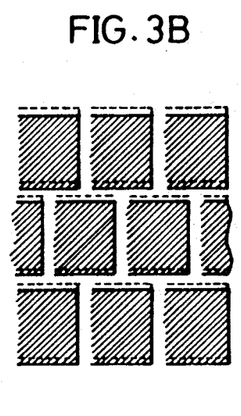
Figure 3C:
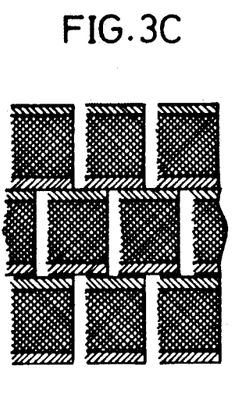
Figure 3D:
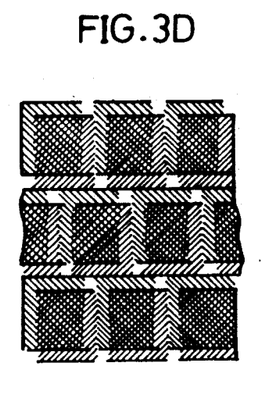

Consequently, the image of FIG. 3A and the image of FIG. 3B are superposed on each other over the screen as seen in FIG. 3C. Further as shown in FIG. 3D, the two images can be superposed as shifted both vertically and horizontally by rotating the optical means 3 about the optical axis through a predetermined angle.

In this way, the shade due to the source lines and gate lines of the liquid crystal panel can be made less apparent.

According to the present embodiment, the optical means 3 is disposed on the light incident side of the projection lens 5 so as to handle images of any magnification, whereas optical means which is shaped in conformity with the contemplated magnification of images can be disposed on the light emanating side of the projection lens 5.

Figure 4:
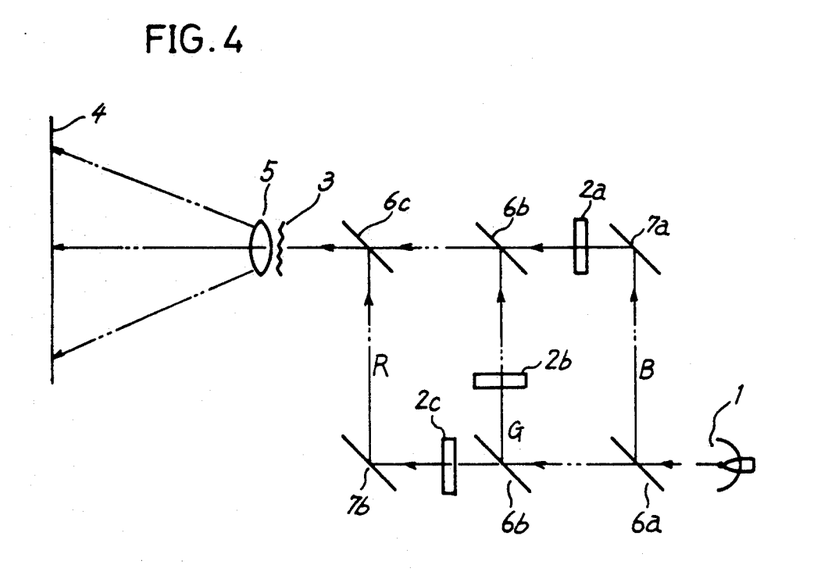
FIG. 4 is a diagram showing the optical system of a liquid crystal projector having three liquid crystal panels.

FIG. 4 shows another liquid crystal projector which comprises a light source 1, a dichroic mirror 6a reflecting blue light only, two dichroic mirrors 6b, 6b reflecting green light only, a dichroic mirror 6c reflecting red light only, two total reflection mirrors 7a, 7b, three liquid crystal panels 2a, 2b, 2c, optical means 3 comprising eight planar glass plates which are uniform in thickness and joined to one another, and a projection lens 5.

The three-panel liquid crystal projector incorporates three liquid crystal panels and therefore has three times the resolution of the single-panel liquid crystal projector. The optical means 3 comprises eight planar glass plates, and each of first and second refracting portions is provided by the four of glass plates, so that the bundle of rays passing through each refracting portion is made more uniform than in the first embodiment to form images of improved quality.

Figure 5:
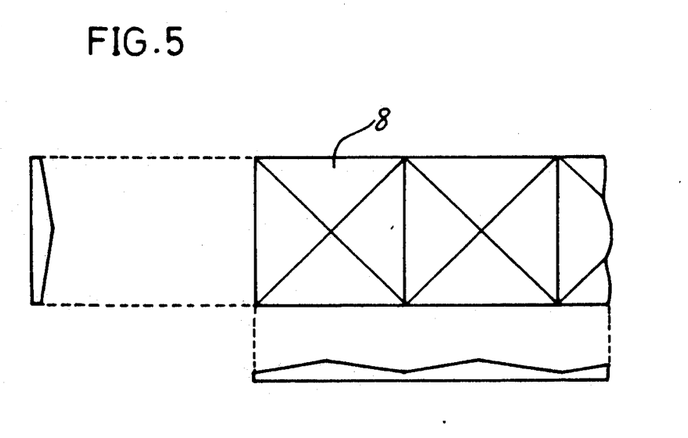
FIG. 5 includes three views showing a portion of a pyramid lens plate for use as optical means.

Although the optical means of the present embodiment comprises eight planar glass plates which are uniform in thickness and joined to one another, the optical means is not limited to this construction. For example as shown in FIG. 5, a lens plate of transparent resin having one or more pyramid portions 8, or pyramid portions which are shaped otherwise is serviceable as optical means.

Figure 6:
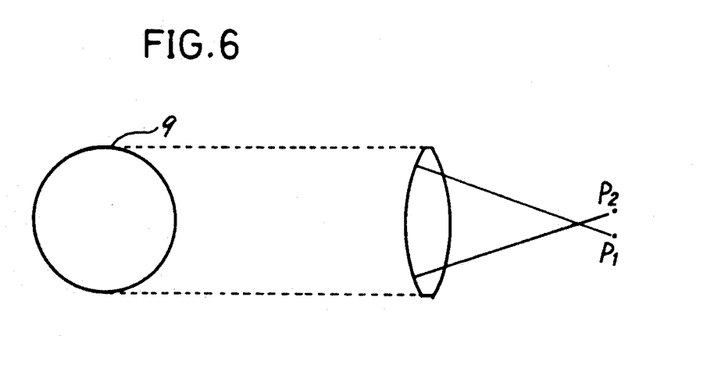
FIG. 6 includes two views showing a modified convex lens for use as optical means.

Further as seen in FIG. 6, the optical means 3 may comprise a modified convex lens 9 wherein the center of curvature, Pl, of the spherical surface of its upper half is out of register with the center of curvature, P2, of the spherical surface of its lower half.

Figure 7:
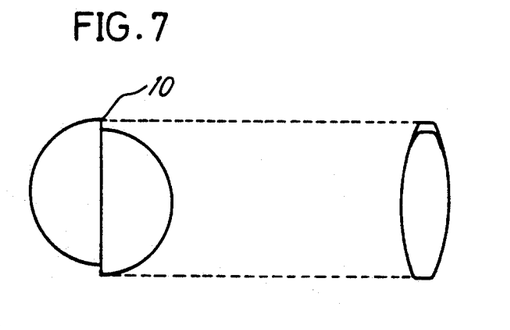
FIG. 7 includes two views showing showing another modified convex lens.

Further as seen in FIG. 7, a pair of convex lens pieces, each in the form of a half of such a lens, may be joined to each other as shifted vertically to provide a single modified convex lens 10 to serve as optical means 3.

Figure 8:
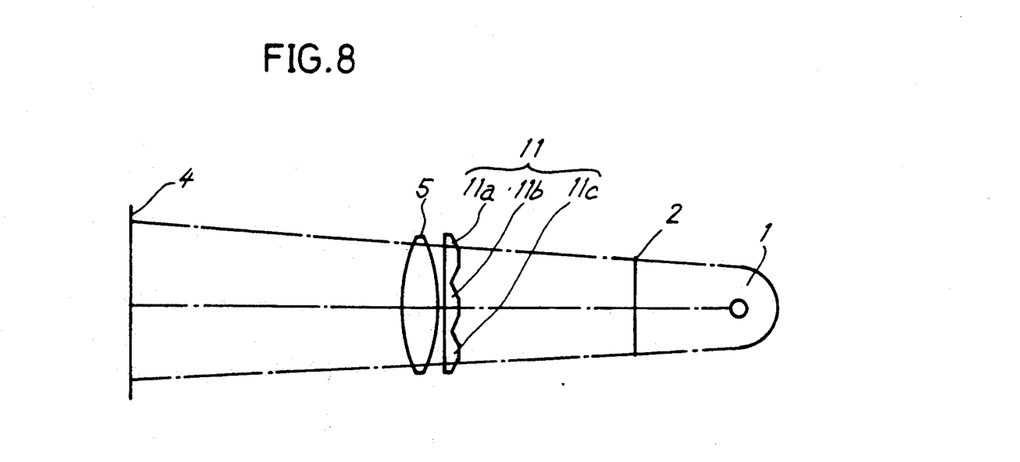
FIG. 8 is a diagram showing the optical system of a liquid crystal projector having a trapezoid lens as optical means.

Also usable as optical means is a modified prism 11 which comprises a plurality of trapezoid prisms 11a, 11b, 11c which are joined to one another as shown in FIG. 8.

The horizontal or vertical shade strips included in the latticelike shade can be made less apparent by using a spherical lens (not shown), which is slightly cylindrical, as the projection lens 5.

Next, embodiments of liquid crystal projectors will be described which have optical means of the light reflection type.

Figure 9:
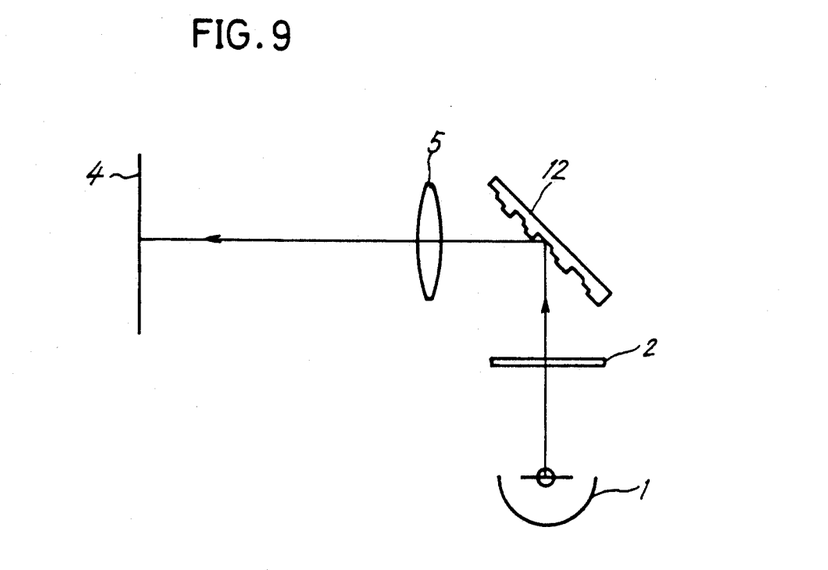
FIG. 9 is a diagram showing the optical system of a liquid crystal projector having optical means of the light reflection type.

FIG. 9 shows a liquid crystal projector which comprises a light source 1 composed of a metal halide lamp and a concave reflector, a single liquid crystal panel 2, a reflecting mirror 12 disposed at an angle of inclination of about 45 deg with respect to the liquid crystal panel 2 for reflecting light passing through the liquid crystal panel toward a projection lens 5, and the projection lens 5 for projecting the reflected light on a screen 4 on an enlarged scale.

Figure 10:
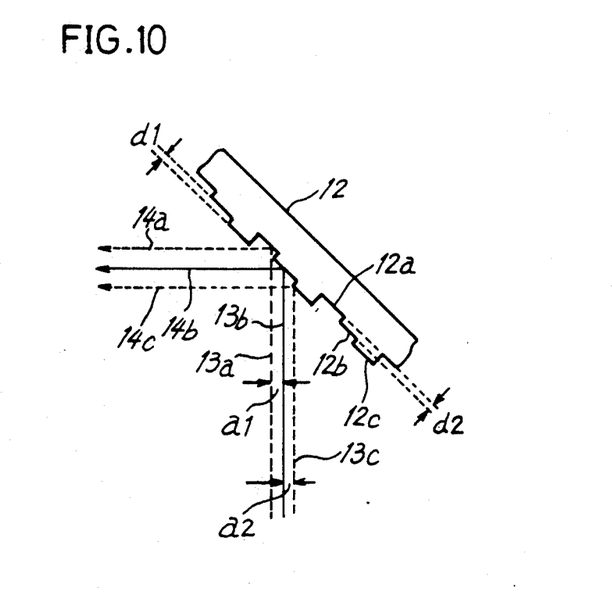
FIG. 10 is a diagram for illustrating reflection of light from a stepped reflecting mirror for use as optical means.

As shown in FIG. 10, the reflecting side of the reflecting mirror 12 is repeatedly formed with stepped portions 12a, 12b, 12c which are different in height to provide different optical path lengths from the liquid crystal panel to the respective stepped portions. The level differences d1 and d2 of the reflecting surface are determined in accordance with the pitch P of picture elements on the liquid crystal panel and the angle of inclination of the reflecting mirror. For example when the picture element pitch P is 0.2 mm and the angle of inclination is 45 deg, each of the level differences d1, d2 of the reflecting mirror is 0.14 mm.

With reference to FIG. 10, of the light passing through the liquid crystal panel, a bundle of rays 13a incident on the stepped portion 12a of the mirror 12, a bundle of rays 13b incident on the stepped portion 12b and a bundle of rays 13c incident on the stepped portion 12c are reflected at the respective portions and advance toward the projection lens 5 as bundles of rays 14a, 14b, 14c. At this time, the optical path lengths from the liquid crystal panel to the respective stepped portions of the reflecting mirror are different from one another, so that the three images projected by the different bundles of rays reflected at the respective stepped portions of the mirror are superposed as vertically displaced from one another by the picture element pitch P.

Figure 11A:
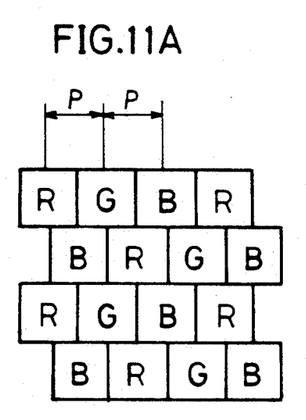
FIG. 11A is a front view showing an arrangement of picture elements forming an original image on a liquid crystal panel.
Figure 11B:
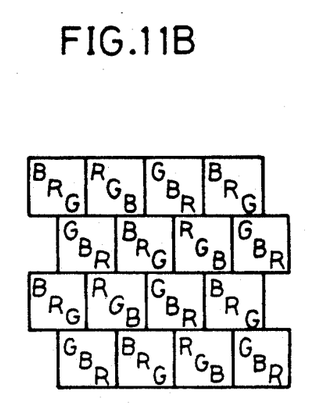
FIG. 11B is a front view showing an arrangement of picture elements forming images superposed by the steppped reflecting mirror.

FIGS. 11A and 11B show how the images are superposed. Picture elements R, G, B of three primary colors forming an image on the liquid crystal panel are arranged at the given pitch P as shown in FIG. 11A. The bundles of rays forming the image are reflected from the stepped reflecting mirror, whereby the three images formed by the light reflected at the corresponding stepped portions are vertically shifted from one another by the picture element pitch P. Accordingly, with one image formed by the combination of rays reflected at particular stepped portions, picture elements are obtained wherein the three primary colors are superposed at the same region as shown in FIG. 11B. Thus, the reflection by the stepped reflecting mirror results in a reduced pitch of picture elements which is one-third of the conventional pitch, consequently producing images of improved quality.

Figure 12:
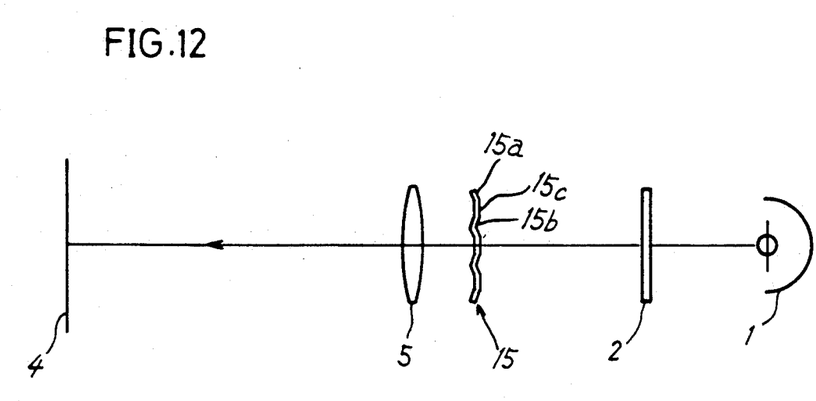
FIG. 12 is a diagram showing the optical system of a liquid crystal projector having a plurality of planar glass plates as optical means.

FIG. 12 shows the same projector as above except that the stepped reflecting mirror 12 is replaced by optical means 15 disposed in an optical path from the liquid crystal panel 2 to the projection lens 5 and comprising nine planar glass plates which are uniform in thickness and joined to one another. More specifically, the optical means 15 comprises a first planar glass plate 15a and a second planar glass plate 15b which are inclined with respect to the optical axis of the liquid crystal panel 2, and a third planar glass plate 15c which is positioned at right angles with the axis. The optical means comprises repeating units of these first to third glass plates which are joined to one another. The first and second glass plates 15a, 15b are disposed at an angle of inclination of about 20 to about 30 deg in accordance with the picture element pitch P of the liquid crystal panel 2. The optical means 15 produces the same effect as the stepped reflecting mirror of FIG. 9.

Although the optical means 15 of the present embodiment comprises nine planar glass plates of uniform thickness, the number of glass plates is not limited to nine.

As described above, the liquid crystal projector embodying the invention comprises optical means disposed between a liquid crystal panel and a screen, and having a plurality of refracting portions for refracting light from the liquid crystal panel along different optical axes or having a plurality of reflecting portions which are different in optical path length from the liquid crystal panel. Consequently, the projector produces projected images of high resolution by a simple construction without necessitating any additional optical axis vibrating device. The present projector can therefore be compacted.

The foregoing embodiments are given for the illustration of the present invention and should not be construed as limiting the scope of the invention as defined in the appended claims or reducing the scope. The construction of the projector is not limited to those of the foregoing embodiments but can of course be modified variously by one skilled in the art without departing from the scope of the invention as defined in the claims.

What is claimed is:

1. A liquid crystal projector comprising:
   three liquid crystal panels for three primary colors for projecting original images formed on the liquid crystal panels onto a screen on an enlarged scale each liquid crystal panel being formed of an array of picture elements having non-transmission portions interspaced between liquid crystal cells;
   optical means provided between the liquid crystal panels and the screen for light from the panels to pass therethrough, the optical means comprising a plurality of light refraction portions joined to one another for projecting original images from the liquid crystal panels onto the screen, as shifted by an amount not greater than the pitch of picture elements;
   wherein each light refracting portion of said plurality of light refracting portions of the optical means comprises a flat glass plate of uniform thickness inclined with respect to the optical axis of the liquid crystal panels;
   and wherein the amount of shift of images on the screen by said plurality of light refracting portions of the optical means approximately corresponds to a band width of latticelike shade produced when nontransmission portions between liquid crystal cells forming the liquid crystal panels are projected as enlarged on the screen.

2. A liquid crystal projector for projecting original images formed on a liquid crystal panel onto a screen on an enlarged scale, the liquid crystal panel being formed of an array of picture elements having non-transmission portions interspaced between liquid crystal cells, the projector comprising optical means provided between the liquid crystal panel and the screen for reflecting light from the liquid crystal panel toward the screen, the optical means comprising a plurality of light reflecting portions joined to one another for projecting original images on the liquid crystal panel onto the screen, as shifted by an amount not greater than the pitch of picture elements.

3. A liquid crystal projector as defined in claim 2 wherein the amount of shift of images on the screen by the light reflecting portions of the optical means approximately corresponds to a band width of latticelike shade produced when nontransmission portions between liquid crystal cells forming the liquid crystal panel are projected as enlarged on the screen.

4. A liquid crystal projector as defined in claim 2 wherein the amount of shift of images on the screen by the light reflecting portions cf the optical means approximately corresponds to a pitch of picture elements obtained when liquid crystal cells forming the panel are projected as enlarged on the screen.

5. A liquid crystal projector as defined in claim 2 wherein the optical means is a reflecting mirror formed on its reflecting side with a plurality of stepped portions serving as the light reflecting portions, and the shift of the images on the screen is realized by a difference between the optical path lengths from the liquid crystal panel to the respective stepped portions of the reflecting mirror.

* * * * *

UNITED STATES PATENT AND TRADEMARK OFFICE
CERTIFICATE OF CORRECTION

PATENT NO.:     5,250,967
DATED      :    October 5, 1993
INVENTOR(S):    MIYASHITA It is certified that error appears in the above-identified patent and that said Letters Patent is hereby corrected as shown below:

On the cover page, Item [30], please change the second priority number "3-135053" to --3-135058--.

Signed and Sealed this

Seventh Day of June, 1994

*Attest:*

BRUCE LEHMAN

*Attesting Officer*        *Commissioner of Patents and Trademarks*